United States Defensive Publication [19] (H) [11] T105,701

Mair [43] Aug. 6, 1985

[54] METHOD TO IMPROVED ACIDULATION QUALITY OF NORTH CAROLINA PHOSPHATE ROCK

[76] Inventor: Alexander D. Mair, Rte. 7, Box 143, Florence, Ala. 35630

[21] Appl. No.: 649,034

[22] Filed: Sep. 10, 1984

[51] Int. Cl.[3] ..... C01B 25/30

[52] U.S. Cl. ..... 423/167

[57] ABSTRACT

Phosphate rock is heated under controlled conditions to essentially eliminate organic impurities and sulfides from the rock when subsequently leached with water to thereby substantially increase the porosity and surface area of the calcined solid and remove any traces of sulfide still remaining in the calcine. This process yields an improved calcined product rendered more suitable for acidulation to wet-process phosphoric acid and is of benefit for unweathered apatitic phosphate rocks of the mineral class known as francolites posessing a moderate to high content of organic impurities and a high degree of carbonate substitution in the apatite crystal lattice, such as that rock originating from the Pungo River Formation of North Carolina. For North Carolina rock, inclusion of the leaching step after calcination at about 800° C. may beneficially provide up to a twentyfold increase in calcine surface area to a level of at least 2 $m^2/g$ and a sulfide content decreased to less than about 0.01 percent by weight.

6 Claims, No Sheets Drawing,

23 Pages Specification

The file of this unexamined application may be inspected and copies thereof may be purchased (849 O.G. 1221, Apr. 9, 1968).